(12) United States Patent
Dupont

(10) Patent No.: US 8,882,353 B2
(45) Date of Patent: Nov. 11, 2014

(54) GAS BEARING AND METHOD OF MANUFACTURING THE SAME

(75) Inventor: Ralf Dupont, Dorset (DE)

(73) Assignees: Ralf Dupont, Dorset (GB); Air Bearings Limited, Dorset (GB)

( * ) Notice: Subject to any disclaimer, the term of this patent is extended or adjusted under 35 U.S.C. 154(b) by 163 days.

(21) Appl. No.: 13/146,123

(22) PCT Filed: Jan. 26, 2010

(86) PCT No.: PCT/GB2010/000115
§ 371 (c)(1),
(2), (4) Date: Sep. 23, 2011

(87) PCT Pub. No.: WO2010/084332
PCT Pub. Date: Jul. 29, 2010

(65) Prior Publication Data
US 2012/0020596 A1    Jan. 26, 2012

(30) Foreign Application Priority Data
Jan. 26, 2009  (GB) .................................. 0901250.1

(51) Int. Cl.
*F16C 31/06*    (2006.01)
*F16C 17/02*    (2006.01)
*F16C 32/06*    (2006.01)
*F16C 33/10*    (2006.01)

(52) U.S. Cl.
CPC ......... *F16C 32/0622* (2013.01); *F16C 33/1005* (2013.01)
USPC ............ 384/109; 384/100; 384/114; 384/123

(58) Field of Classification Search
USPC ................. 384/100, 107–110, 113, 120, 123; 415/90; 417/423.14
See application file for complete search history.

(56) References Cited

U.S. PATENT DOCUMENTS

| | | | |
|---|---|---|---|
| 3,013,845 A | 12/1961 | Loch | |
| 3,472,565 A * | 10/1969 | Arneson | ........................ 384/113 |
| 3,698,774 A | 10/1972 | Saulgeot et al. | |
| 3,719,405 A | 3/1973 | Izumi et al. | |
| 3,832,084 A * | 8/1974 | Maurice | ........................ 415/90 |

(Continued)

FOREIGN PATENT DOCUMENTS

| | | |
|---|---|---|
| DE | 100 62 106 A1 | 6/2002 |
| DE | 100 62 603 A1 | 6/2002 |

(Continued)

*Primary Examiner* — Marcus Charles
(74) *Attorney, Agent, or Firm* — McDermott Will & Emery LLP

(57) ABSTRACT

A gas bearing (100) having pressurized axially extending chambers (110) in a housing (102) having a shaft bore (104) therein, the axially chambers (110) being in fluid communication with a bearing surface (108) that defines the bore via laser-drilled capillaries (118). The end (122) of each laser-drilled capillary at the bearing surface (108) is flared such that the narrowest portion of the capillary is set back from the bearing surface (108). This shape can ensure that the load carrying function of the bearing (100) does not fail during shaft eccentricity by ensuring that pressure restriction must happen within the capillary and not the gap being shaft and bearing surface. The bearing surface may face in an axial and/or radial direction with respect to the shaft. The axial chambers may be pressurized axially such that the outer circumference of the housing is unbroken and hence usable for other purposes.

10 Claims, 4 Drawing Sheets

(56) References Cited

U.S. PATENT DOCUMENTS

| | | | |
|---|---|---|---|
| 4,715,731 A * | 12/1987 | Tittizer | 384/100 |
| 5,564,063 A | 10/1996 | Heinzl et al. | |
| 5,645,354 A | 7/1997 | Heinzl et al. | |
| 5,653,479 A * | 8/1997 | Henderson | 285/261 |
| 5,791,786 A | 8/1998 | Stahlecker | |
| 5,800,066 A | 9/1998 | Hayashi | |
| 6,368,082 B1 * | 4/2002 | Conrad et al. | 417/423.4 |
| 6,398,484 B1 * | 6/2002 | Orikasa et al. | 415/112 |
| 6,468,057 B1 * | 10/2002 | Beck | 417/416 |
| 6,491,435 B1 * | 12/2002 | Nishikawa et al. | 384/12 |
| 6,524,004 B2 * | 2/2003 | Fujikawa et al. | 384/100 |
| 6,695,479 B2 | 2/2004 | Pohn et al. | |
| 6,729,762 B2 | 5/2004 | Satou et al. | |
| 6,744,010 B1 * | 6/2004 | Pepe et al. | 219/121.71 |
| 6,857,275 B2 * | 2/2005 | Pidcock et al. | 60/796 |
| 7,059,607 B2 * | 6/2006 | Nakamura et al. | 277/432 |
| 7,059,828 B2 * | 6/2006 | Conrad et al. | 415/90 |
| 7,101,085 B2 * | 9/2006 | Grantz et al. | 384/110 |
| 2006/0147130 A1 | 7/2006 | Ruijl | |
| 2008/0256797 A1 | 10/2008 | Lind | |

FOREIGN PATENT DOCUMENTS

| | | | |
|---|---|---|---|
| DE | 102006048718 A1 * | 4/2008 | |
| EP | 0 922 873 A2 | 6/1999 | |
| EP | 1043505 A2 * | 10/2000 | F04D 29/04 |
| EP | 1 816 361 A1 | 8/2007 | |
| GB | 1 309 712 A | 3/1973 | |
| GB | 2 302 144 A | 1/1997 | |
| GB | 2 467 168 A | 7/2010 | |
| JP | 63297734 A * | 12/1988 | F02B 39/00 |
| JP | U 3104039 | 9/2004 | |
| JP | 2007285386 (A) | 11/2007 | |
| WO | 2004/055400 A1 | 7/2004 | |
| WO | 2007/054414 A1 | 5/2007 | |
| WO | 2008/001083 A1 | 1/2008 | |
| WO | 2008/053196 A1 | 5/2008 | |

* cited by examiner

GAS BEARING AND METHOD OF MANUFACTURING THE SAME

CROSS REFERENCE TO PRIOR APPLICATIONS

This application is a U.S. National Phase application under 35 U.S.C. §371 of international Application No. PCT/GB2010/000115, filed on Jan. 26, 2010 and claims benefit of priority to United Kingdom Patent Application No. 0901250.1, filed on Jan. 26, 2009. The International Application was published in English on Jul. 29, 2010 as WO 2010/084332 A1 under PCT Article 21(2). All of these applications are herein incorporated by reference.

FIELD OF THE INVENTION

The invention relates to non-self-acting gas bearings for high speed relative rotation between two mating components.

BACKGROUND TO THE INVENTION

To provide the ability to generate a restoring force to compensate for non-zero shaft eccentricity in a non-self-acting bearing, it is known that a restriction of the passageway from a supply pressure to the bearing surface, e.g. using a plurality of jets, is needed.

Each jet restricts the supply pressure to an intermediate pressure that is also dependent on the bearing gap width (i.e. distance between the bearing surface and the shaft) at the jet. The smaller the bearing gap width the higher the intermediate pressure. Under concentric conditions the intermediate pressures created by diametrically opposed jets is equal by symmetry. However, if the axis of the shaft is displaced from the axis of the bore (i.e. non-zero eccentricity) the intermediate pressure at a jet with a smaller bearing gap width will be higher than the intermediate pressure at a jet with a larger bearing gap width, thereby causing a restoring force which acts to correct the misalignment. If the passageways to the bearing surface are not restricted, the shaft experiences only the supply pressure; no pressure unbalance and therefore no restoring force occurs when there is non-zero eccentricity.

FIG. 1 is a cross-sectional view of a journal gas bearing 10 in which jets are provided to restrict gas passage between a gas supply and a bearing gap. The gas bearing 10 comprises a bearing housing 12 having a shaft bore 14 formed therein for receiving a shaft 16. The inside wall of the shaft bore 14 is a bearing surface 18. Radial passageways 20 through the bearing housing 12 provide fluid interaction between the bearing surface 18 and a pressurised gas supply (not shown). For example, as indicated by arrows in FIG. 1, compressed air may be pumped into each passageway 20 through a respective opening 22.

A jet 24 is inserted as a plug into each passageway at the entrance on the bearing surface 18. Each jet 24 is a cylindrical block sized to fit tightly into the passageway 20. Each jet 24 has a narrow through hole (e.g. rounded air gas-outlet) 26 which provides fluid communication from the bearing surface 18 to the interior of the passageway 20. The tight fit of the jet 24 in the passageway 20 ensures gas from the passageway 20 can only reach the bearing surface via the through hole 26.

As shown in an expanded view of a jet 24 in FIG. 1, the through hole 26 includes a constricted portion 28 located towards the bearing surface. The through hole 26 includes tapering section 30, 32 in which the diameter of the through hole decreases towards the constricted portion 28.

Each jet is made as a separate part, e.g. formed by a shaped drill or by a turning operation, before being mounted radially in the bearing housing 12.

However, as the desired operation speed of rotating machinery increases, so the size of components, e.g. shaft diameters and bearing gap widths, needs to be reduced. Such size reduction results in a need for very small jet diameters. As desired jet diameters approach 75 μm or less, e.g. 50 μm or less) the limit of what can be effectively machinable in a commercial manner draws near. In particular, any advantage associated with manufacturing jets as separate components is been replaced by problems resulting from assembling the jets in the bearing housing, finding suitable materials for the jets and finishing the bearing surface.

In light of these problems, it has been suggested that radially oriented laser-drilled blind holes may be used in place of jet plugs for high-speed bearings (e.g. for relative rotational speed in excess of 200 ms$^{-1}$). U.S. Pat. No. 5,645,354 discloses an example of laser-drilled micro-holes formed in a bearing surface.

FIG. 2 is a cross-sectional view of a journal gas bearing 34 in which laser-drilled micro-holes are provided to restrict gas passage between a gas supply and a bearing surface. Components in common with the bearing shown in FIG. 1 are given the same reference numbers and are not described again.

In this arrangement each passageway 20 terminates at the bearing surface 18 with an integral restriction 36. The expanded part of FIG. 2 shows the integral restriction 36 to comprise a radial blind hole 38 having a flat bottom 40 with a laser-drilled capillary 42 being the sole means for providing fluid communication between the bearing surface 18 and the radial blind hole 38. The capillary 42 is formed by directing a high energy beam, e.g. laser beam onto the flat bottom 40 of the blind hole 38 from outside the bearing housing 12. FIG. 2 shows the laser-drilled capillary 42 to have a nozzle-like shape, i.e. tapering to provide the smallest diameter at the bearing surface 18 as recommended by U.S. Pat. No. 5,645,354.

The intermediate pressure is predominately determined by the diameter of the laser-drilled capillaries.

The arrangement shown in FIG. 2 may help to address problems regarding material mating, deformation and make the production of journal bearings more cost effective.

US 2008/0256797 discloses laser-drilling capillaries from inside the shaft bore.

SUMMARY OF THE INVENTION

The disclosure herein discusses developments of gas bearings having laser-drilled capillaries, in particular with a view to enabling the bearing to work at high rotational speeds, e.g. in excess of 400000 or 500000 rpm.

Expressed generally, one aspect of the invention proposes flaring the end of the laser-drilled capillary at the bearing surface, i.e. such that the narrowest portion of the capillary is set back from the bearing surface. This shape may ensure that the load carrying function of the bearing does not fail during shaft eccentricity as the pressure restriction has to happen within the jet and not the bearing gap. The narrowest portion is therefore set back in a pocket or cavity formed in the bearing surface. Without the pocket or cavity at the end of the capillary, the pressure restriction may happen within the bearing gap for high eccentricities of the bearing counter part (e.g. shaft), where no restoring force against this disturbance can occur. According to this aspect, there may be provided a gas bearing comprising a bearing housing having a shaft bore defined by a radially inwardly facing bearing surface, and a plurality of radially extending capillaries laser-drilled through the bearing surface to provide fluid communication between the bearing surface and a pressurisable space contained in the bearing housing, wherein each laser-drilled capillary includes an gas-outlet at the bearing surface which tapers inwards as it extends away from the bearing surface. In other words, a gas flow path through the gas-outlet has a cross-sectional area which decreases as the gas flow path extends away from the bearing surface. A portion of the gas-outlet at the bearing surface may thus resemble an indented pocket formed in the bearing surface. The capillary may extend radially away from the base of the pocket. The gas-outlet may taper in a linear fashion (e.g. to define a conical pocket) or a curved fashion (e.g. to define a spherical pocket). A method of manufacturing the capillaries is disclosed below.

The plurality of laser-drilled capillaries may be located around a common circumference of the bearing surface. There may be two or more circumferential series (e.g. rows) of capillaries on the bearing surface. Each series or row may comprise one capillary or a plurality of capillaries at a plurality of points located at regular intervals around the circumference. The circumferential series may be symmetrical but this not essential. The location of the points for all capillaries may be determined in advance of laser-drilling. In one arrangement a pair of capillaries is located at each point. The pair may be located closely together along an axial line along the bearing surface. This arrangement can facilitate an even pressure profile along the bearing surface.

The capillaries need not extend solely in a radial direction, i.e. they may slope axially as they extend away from the bearing surface.

The pressurisable space may include a volume contained wholly within the bearing housing. For example, the pressurisable space may comprise a plurality of chambers in fluid communication with each other along a common channel, wherein one or more of the chambers has an inlet conduit extending thereto from the outside of the bearing housing. A gas supply, e.g. compressed air or the like, may be connected to the chambers via the inlet conduit(s) to provide pressure to the pressurisable space. The inlet conduit may exit the bearing housing at an axial end thereof. As a result, the outer circumferential surface of the bearing housing may be unbroken, i.e. have no passages formed therein for communicating with the interior of the bearing housing. An advantage of this arrangement is that it frees the outer circumferential surface for other uses, such as conveying coolant or wiring, without interfering with the bearing operation. This arrangement may represent another aspect of the invention.

The plurality of chambers may comprise a plurality of separate axially extending bores arranged regularly on a ring around the shaft bore. The axial bores may be identical, e.g. have the same diameter and length. An annular channel, e.g. at an axial end of the bores may perform the function of the common channel. The axial bores and/or annular channel may be drilled, e.g. mechanically drilled, into the bearing housing. This arrangement permits the bearing housing to be both made in one piece and to have an unbroken outer circumferential surface.

The concepts discussed above may also be applicable to a gas thrust bearing. The bearing housing may thus include an axially facing bearing surface e.g. at an axial end thereof, and a plurality of axially extending capillaries laser-drilled through the axially facing bearing surface to provide fluid communication between the axially facing bearing surface and the pressurisable space contained in the bearing housing, wherein each laser-drilled capillary includes an gas-outlet at the axially facing bearing surface which tapers inwards as it extends away from the bearing surface. In this arrangement the gas bearing performs as both a journal bearing (radially extending capillaries) and as a thrust bearing (axially extending capillaries). The gas bearing may be either solely a journal bearing or solely a thrust bearing. Accordingly, this aspect of the invention may also be expressed as a gas bearing comprising a bearing housing having a shaft bore that terminates at a bearing surface facing in an axial direction, and a plurality of axially extending capillaries laser-drilled through the bearing surface to provide fluid communication between the bearing surface and a pressurisable space contained in the bearing housing, wherein each laser-drilled capillary includes an gas-outlet at the bearing surface which tapers inwards as it extends away from the bearing surface. In this case, each gas-outlet may be part of an annular channel on the bearing surface that links each capillary. The channel may be a tapered annular groove concentric with the shaft bore.

This aspect of the invention may also be expressed as a method of manufacturing a gas bearing comprising a bearing housing having a shaft bore defined by a radially inwardly facing bearing surface, the method including: directing a laser beam to be incident on the bearing surface from within the shaft bore to drill a radially extending capillary through the bearing surface into a pressurisable space contained in the bearing housing; and focussing the laser beam to form an inwardly tapering gas-outlet to the capillary at the bearing surface during drilling of the capillary. The laser beam may be any suitable high energy beam for vaporising the material of the bearing housing. In one embodiment an Nd:YAG laser is used. The laser beam may be pulsed to deliver the required energy for vaporisation. The pulse frequency may be 0 Hz (constant) or more, e.g. 20 kHz or more. The pulse duration may be short, e.g. about 10 ns, which may enable the material to be more efficiently ejected during drilling.

The method may include optically manipulating an output beam from a laser beam generator, e.g. using mirroring prisms or pure mirrors, to direct it onto the bearing surface from within the shaft. The optical manipulation may include orienting the laser beam so that it is substantially normal or at a defined angle to the bearing surface at impact. A reflecting mirror or refracting prism may be inserted into the shaft bore to deflect a laser beam travelling along the axial of the shaft bore into a radial laser beam incident of the bearing surface.

Further optical manipulation may be provided by an optical device (e.g. lens) arranged to focus, e.g. narrow, or deflect the laser beam before it is incident on the bearing surface. The optical device (which may be a prism or a curved mirror) may be arranged to transform a beam of constant cross-section into a beam of varying cross-section. The optical unit may be focus the laser beam towards a focal point at which the beam of varying cross-section is at its narrowest. To create the inwardly tapering gas-outlet, the optical unit may be arranged such that the focal point lies inside the bearing housing, i.e. is displaced from the bearing surface radially away from the shaft bore. The focal point may be located in the bearing housing before the laser beam reaches the pressurisable space. This may prevent the laser beam from affecting the far wall of the pressurisable space if it continues to operate after the capillary is open.

Alternatively, the opening of the gas-outlet and the capillary may be manufactured as separate steps. For example, the capillary beyond the gas-outlet may be straight or tapered inwards or outwards. The optical unit may thus be arranged to adopt different focus configurations for the capillary and the gas-outlet.

The method may include rotating the bearing housing relative to the laser beam about the shaft bore axis, whereby a predetermined plurality of radially extending capillaries can be laser-drilled without requiring adjustment of the laser beam or optical unit.

The method may also be used for manufacturing axially extending capillaries into an axially facing bearing surface.

As mentioned above, another aspect of the invention relates generally to a bearing housing having an unbroken outer circumferential surface. According to this aspect, there may be provided a gas bearing comprising a bearing housing having a shaft bore defined by a radially inwardly facing bearing surface, a plurality of radially extending capillaries laser-drilled through the bearing surface to provide fluid communication between the bearing surface and a pressurisable space contained in the bearing housing, and a gas feed passage formed in an axial end of the bearing housing to provide fluid communication between the pressurisable space and a gas supply, wherein the bearing housing includes an unbroken circumferential layer located radially outwardly from the pressurisable space.

As discussed above with respect to FIGS. 1 and 2, the conventional construction of journal gas bearings required radial access for a mechanical drill from the outer circumferential surface of the bearing housing. The radial bores used for this were also used to supply pressurised gas to the bearing surface. Thus, the outer circumferential surface of a conventional journal gas bearing housing is broken by the ends of the radial bores used for supply pressurised gas to the bearing surface.

The present aspect is built on the discovery that the means for supplying pressurised gas to the bearing surface may be restructured if a mechanical drill no longer requires access through the outer circumferential surface of the bearing housing. For example, the radial bores of conventional gas bearings may be replaced by a pressurisable space contained in the bearing housing that is formed, e.g. mechanically drilled, from an axial face of the bearing housing. For example, the pressurisable space may be a plurality of separate axially extending bores formed around the shaft bore as described above.

The unbroken circumferential layer of the bearing housing may be immediately adjacent to the pressurisable space. It may be part of the same piece of material in which the pressurisable space is formed.

A primary use of the unbroken circumferential layer may be as part of a cooling system, e.g. to convey coolant (e.g. water) in close proximity to the bearing surface and pressurisable space, to facilitate efficient cooling thereof. Efficient cooling is important in bearings, especially as rotational speeds increase because the frictional power losses are proportional to the square of the turning frequency.

The unbroken circumferential layer may be used for other purposes, e.g. to convey wiring or the like.

The features of the above-described aspects may be combined.

BRIEF DESCRIPTION OF THE DRAWINGS

Examples of the invention are described below with reference to the accompanying drawings, in which.

DETAILED DESCRIPTION; FURTHER OPTIONS AND PREFERENCES

Figure 1:
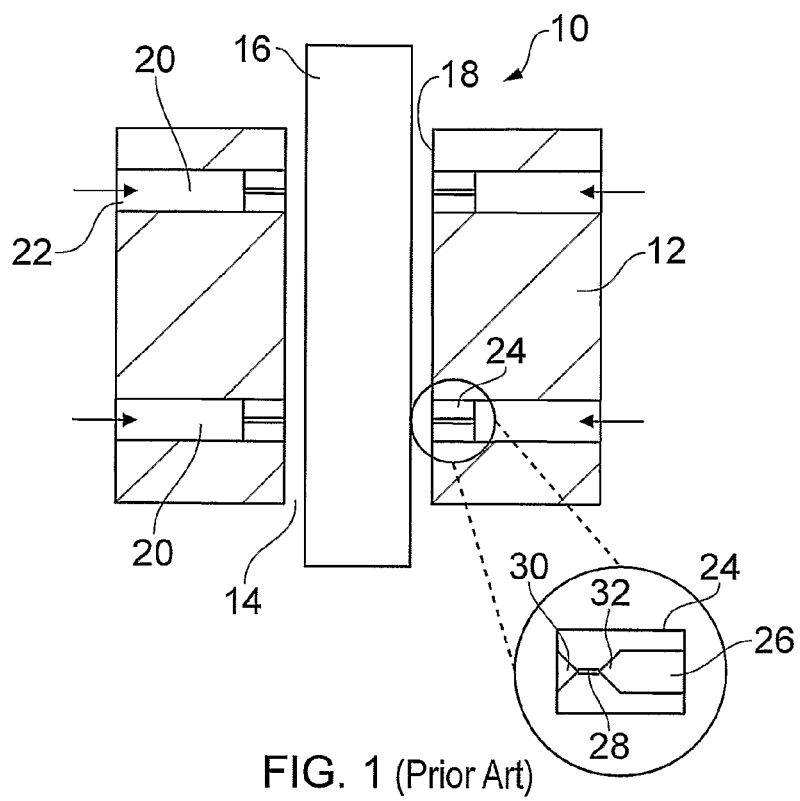
FIG. 1 is a schematic cross-sectional view of a conventional journal gas bearing having separate mounted radial jets and is discussed above.
Figure 2:
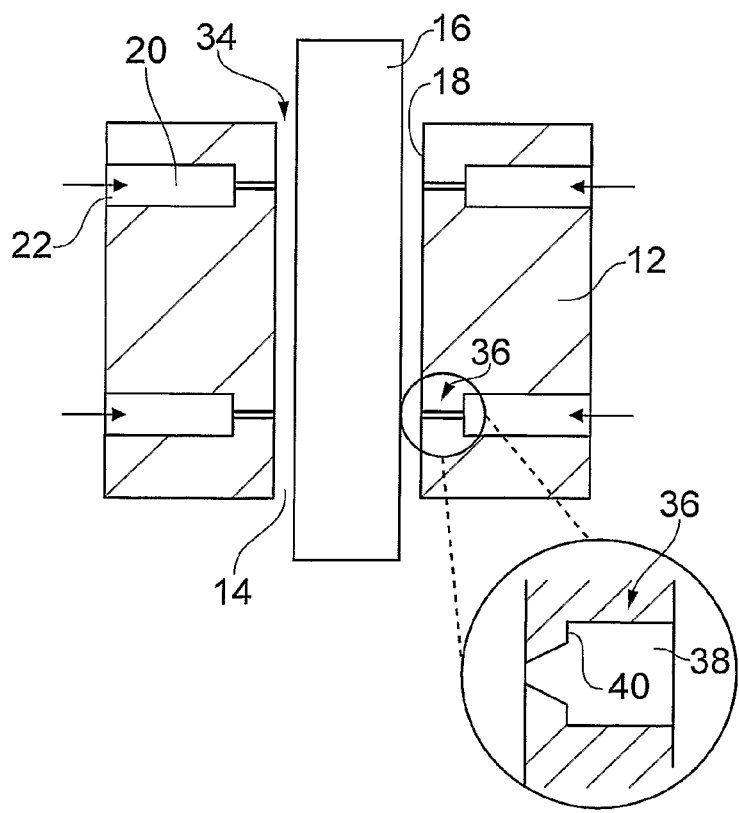
FIG. 2 is a schematic cross-sectional view of a conventional journal gas bearing having laser-drilled radial capillaries and is discussed above.
Figure 3:
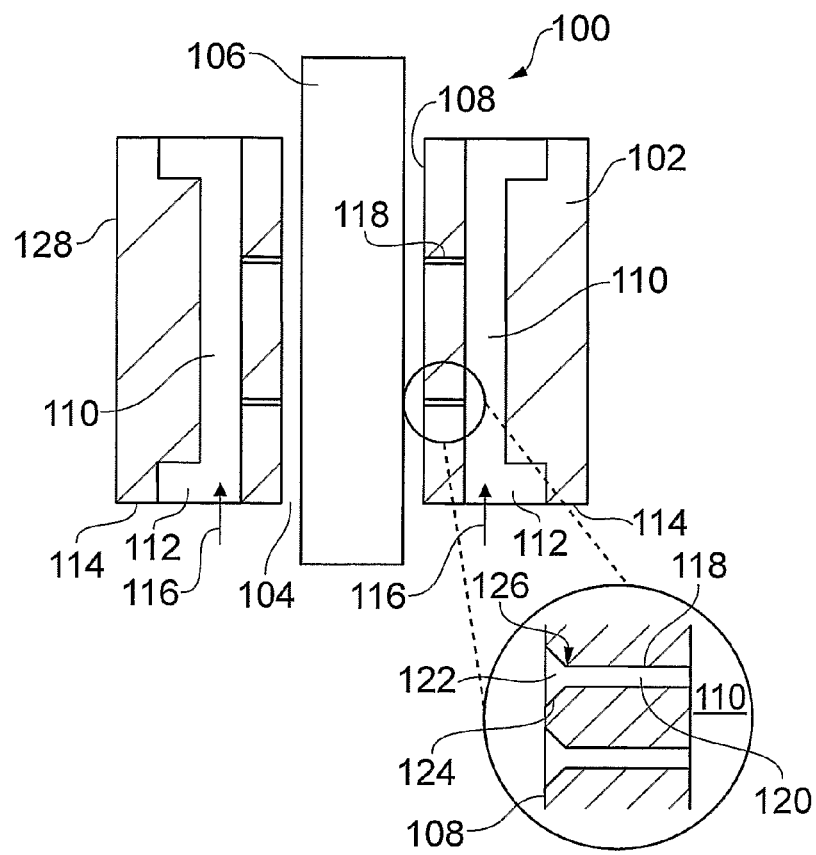
FIG. 3 is a schematic cross-sectional view of a journal gas bearing that is a first embodiment of the invention.

FIG. 3 shows a schematic cross-section of a journal gas bearing 100 that is an embodiment of the invention. The gas bearing 100 comprises a bearing housing 102 having a shaft bore 104 formed (e.g. mechanically drilled) through it. A shaft 106 mates with the bearing housing 102 by being received along its axis in the shaft bore 104. A bearing surface 108, which defines the shaft bore 104, has a diameter greater than the diameter of the shaft 106 so that an annular gap exists between the two.

The bearing housing 102 contains a plurality of axially extending chambers 110. As shown in FIG. 3, the chambers 110 each have an opening 112 formed at an axial end 114 of the bearing housing 102. The openings 112 may be arranged to receive pressurised gas from a gas supply as indicated by arrows 116. The axial extending chambers 110 thus comprise a pressurisable space contained in the bearing housing 102.

A plurality of laser drilled capillaries 118 provide fluid communication between the bearing surface 108 and the axially extending chambers 110. In this embodiment, the plurality of laser-drilled capillaries 118 are arranged in two circumferential series. Each series comprises a plurality of pairs of capillaries regularly spaced around the circumference of the bearing surface 108. Each pair of capillaries connects the bearing surface 108 to a respective axially extending chamber 110. In this embodiment, each axially extending chamber 110 is connected to the bearing surface by a pair of capillaries from each circumferential series. This arrangement may have the advantage of providing a balanced pressure profile in an axial direction along the bearing surface 108.

As shown in the expanded portion of FIG. 3, each member of the pair of laser-drilled capillaries 118 is separated from the other along the bearing surface 108 in the axial direction. Each capillary comprises a bore 120 extending between the bearing surface 108 and the axially extending chamber 110, and an inwardly tapering gas-outlet 122 at the bearing surface 108. In this embodiment the gas-outlet 122 is defined by linearly sloping walls 124, which form a conical pocket. Other embodiments may comprise any kind of opening that exhibits a cross-section area that decreases away from the bearing surface 108. The opening of the capillary 118 into the bearing surface 108 has a diameter greater than the diameter of the bore 120 where it meets the gas-outlet 122. The shape of the bore 120 beyond its junction 126 with the gas-outlet 122 may not be critical to the functioning of the bearing. In FIG. 3 the bore 120 is illustrated as being straight (constant diameter). In other embodiments it may taper inwards or outwards.

In use the constricted passageway through the laser-drilled capillaries means that an intermediate pressure (i.e. a pressure between that of the gas in the chambers 110 and that of the atmosphere outside the bore) is experienced by the shaft. The intermediate pressure is arranged to be high enough for the shaft to float within the shaft bore during rotation, i.e. to prevent contact between the bearing surface and shaft.

By providing pockets that taper inwardly as they extend away from the bearing surface into each laser-drilled capillary, the invention is able to ensure that the pressure restriction happens in the capillary and not in the bearing gap even for high eccentricities. Without an inwardly tapering pocket on the gas-outlet, the pressure drop to the intermediate pressure could happen for high eccentricities in the bearing gap (i.e. outside the capillary) in direction of the highest bearing gap reduction as it would be the smallest cross section then. A failure to carry the load which causes the eccentricity would be the result. An opening of the capillary cross section can ensure that throttling happens within the capillary.

Moreover, through the provision of axially extending chambers 110 in the bearing housing 102, the outer circumferential surface 128 of the bearing housing is unbroken, i.e. there is a circumferential layer between the outer circumferential surface 128 and the axially extending chambers 110 that is free to be used e.g. for coolant or the like.

Figure 4:
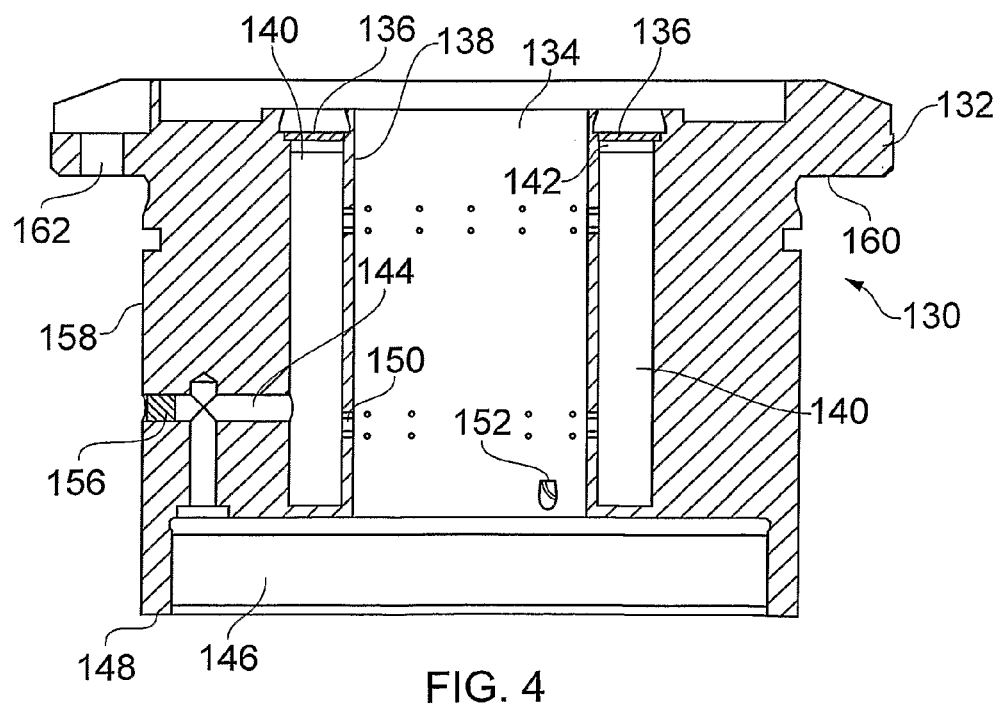
FIG. 4 is a cross-sectional view of a journal gas bearing that is a second embodiment of the invention.
Figure 5:
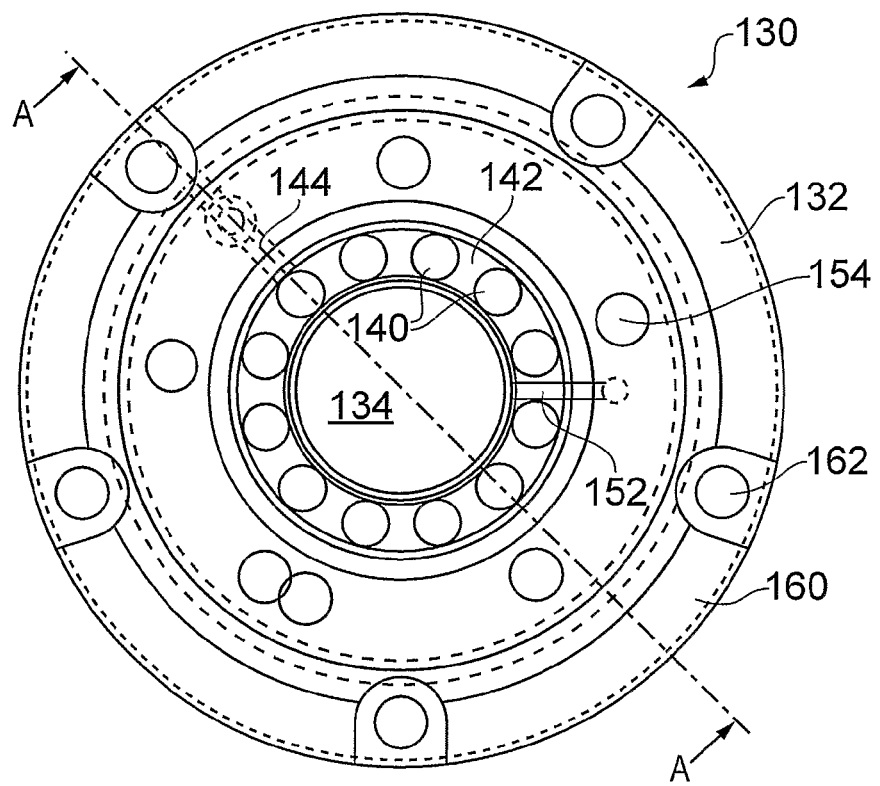
FIG. 5 is a plan view of the journal gas bearing shown in FIG. 4.

FIGS. 4 and 5 show a cross-sectional view and a plan view respectively of a more detailed representation of a journal gas bearing that is an embodiment of the invention. In this embodiment, gas bearing 130 comprises bearing housing 132 having a shaft bore 134 formed therethrough in a similar manner to FIG. 3. The shaft bore is defined by a radially inward facing bearing surface 138. In this embodiment, the pressurisable space is formed by a plurality of mechanically drilled axially extending bores 140. These bores are mechanically drilled into an axially end face of the bearing housing 132. In the embodiment shown, they are drilled downwards from the top surface as shown in FIG. 4. FIG. 5 shows that the axial bores 140 form an annular ring around and concentric with the shaft bore 134. An annular channel 142 is machined around the tops of the axial bores 140 to provide a common fluid distribution between them. After this is done, the axial bores are closed, e.g. with a sealant 136 to form a pressurisable space within the bearing housing 132. A pressurised gas supply conduit 144 is machined into the opposite axial end of the bearing housing 132 to connect one of the axial bores 140 with a pressurised gas source which can be connected to pressurise a cavity 146 formed in the axial end 148 of the bearing housing 132. In an alternative embodiment, the common cavity 146 is pressurised directly. The pressurised gas from conduit 144 is able to flow to all of the axial bores 140 via the common annular channel 142. Consequently, the axial bores 140 may be pressurised to the same degree as one another.

A plurality of radially extending capillaries are laser-drilled into the bearing surface 138 to provide fluid communication between the bearing surface 138 and the pressurisable space formed by the axial bores 140. Similarly to the embodiment shown in FIG. 3, the plurality of laser-drilled capillaries 150 shown in FIG. 4 are arranged in two circumferential series, each series comprising a plurality of pairs of capillaries spaced at regular intervals around the circumference of the bearing surface 138. The position of each pair of laser-drilled capillaries is defined before drilling takes place. In this embodiment the capillaries are selected to be at the location where the wall of the bearing housing between the bearing surface 138 and each axial bore 140 is thinnest. This may facilitate energy-efficient manufacture. In another embodiment, it may be determined that twelve axial holes and twenty-four laser-drilled capillaries per axial plane are required. This arrangement may minimize the circumferential distance between each pair of capillaries.

A gas exhaust outlet 152 is provided to connect the bearing surface 138 to an external environment to create the necessary pressure gradient between the inside of the shaft bore and the inside of the axial bores 140.

As illustrated in FIG. 4, the pressurised gas supply conduit 144 is manufactured by drilling a radial bore and an intersecting axial bore and then plugging the part of the radial bore at the outer circumferential surface of the bearing housing 132 with a stopper 156. This ensures that the outer circumferential surface of the bearing housing 132 is unbroken in the same way as the bearing shown in FIG. 3.

However, this may also be achieved by forming the pressurised gas supply conduit directly from the cavity 146 into one of the axial bores, e.g. via a diagonally extending channel or the like. The outer circumferential surface 158 of the bearing housing 132 may thus be free for use in a cooling system, e.g. to receive a water-cooled jacket or the like.

FIG. 5 shows a plan view of the gas bearing 130 shown in FIG. 4. The line A-A in FIG. 5 is the line along which the cross-section shown in FIG. 4 is taken. Also visible in FIG. 5 are a plurality of axially extending through holes 154 through the bearing housing 132, e.g. for receiving screws to connect adjacent bearing housings. The bearing housing 132 also includes a flange 160 around one axial end. The outwardly protruding flange 160 has a plurality of bolt holes 162 formed therein for fixing the bearing housing in place.

Figure 6:
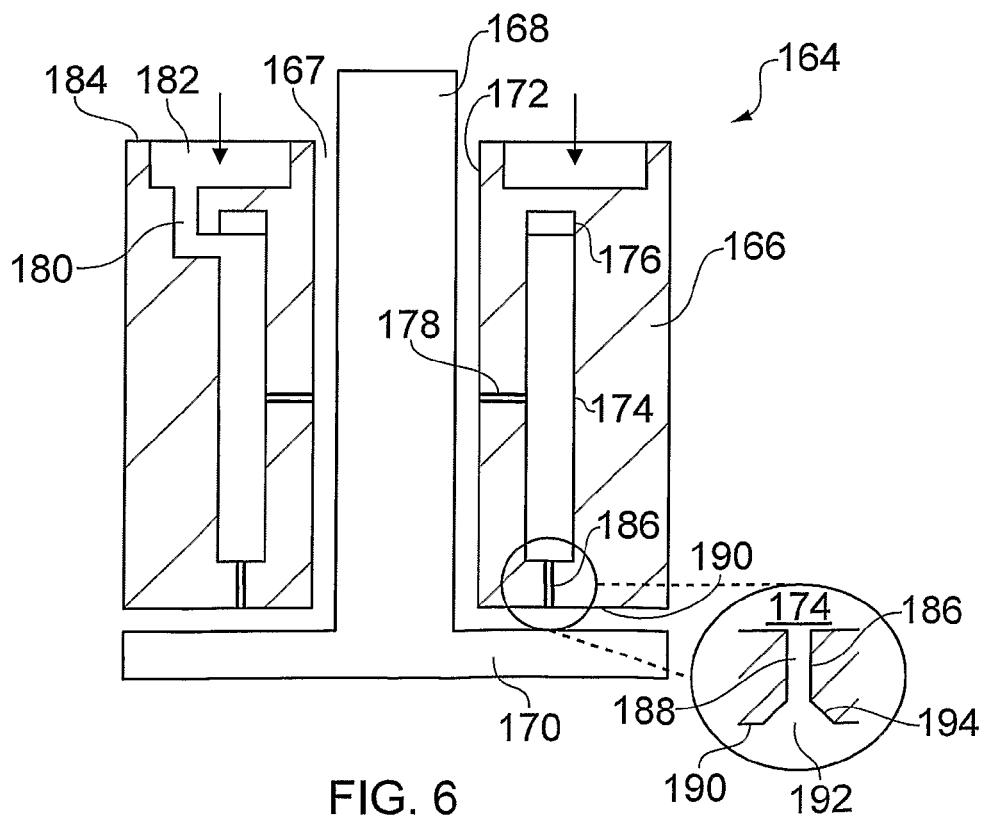
FIG. 6 is a schematic cross-sectional view of a gas bearing that is a third embodiment of the invention.

FIG. 6 is a schematic cross-sectional view of a gas bearing 164 that acts as both a journal bearing and a thrust bearing. The gas bearing 164 comprises a bearing housing 166 having a shaft bore defined by a radially inwardly facing bearing surface 172 formed therein. A shaft 168 is received in the shaft bore 167. In this embodiment, the shaft has a thrust runner 170 located adjacent a bottom axial end of the bearing housing 166 which in this embodiment is an axially facing bearing surface 190 (thrust bearing).

Similarly to the embodiment discussed with respect to FIGS. 4 and 5, the bearing housing 166 has a plurality of axial bores 174 formed therein. As above, the axial bores 174 are arranged in an annular series around the shaft bore 167. An annular channel 176 is provided at an axial end of the axial bores 174 to provide a common fluid communication link between them. The elements above the annular channel 176 may be part of a top plate sealed on the housing after the annular channel 176 is machined. A pressurised gas supply conduit 180 is connected between one of the axial bores 174 and a cavity 182 arranged at an axial end 184 of the bearing housing 166 to receive pressurised gas from a suitable gas supply. A plurality of radially extending capillaries 178 are laser drilled into the bearing surface 172 to provide fluid communication between the bearing surface 172 and the axial bores 174. The configuration of the capillaries is as described above except that there is only one circumferential series in this embodiment.

To provide the thrust bearing functionality, a plurality of axially extending capillaries 186 are laser drilled into the axially facing bearing surface 190 to provide fluid communication between the bearing surface 190 and the axial bores 174. As shown in the expanded section of FIG. 6, the axially extending capillaries 186 are also provided with inwardly tapering gas-outlets at the bearing surface 190 to ensure the pressure restriction function of the capillaries even at high eccentricities. Thus, each axially extending capillary 186 comprises a bore 188 and an opening 192. The opening 192 has an opening 194 which ensure that the diameter of the capillary 186 at the bearing surface 190 is greater than the diameter of the bore 188 at its junction with the opening 192. In this embodiment, the opening 192 may be a conical pocket similar to those discussed above, or may be part of an annular groove formed in the axial facing bearing surface.

Figure 7:
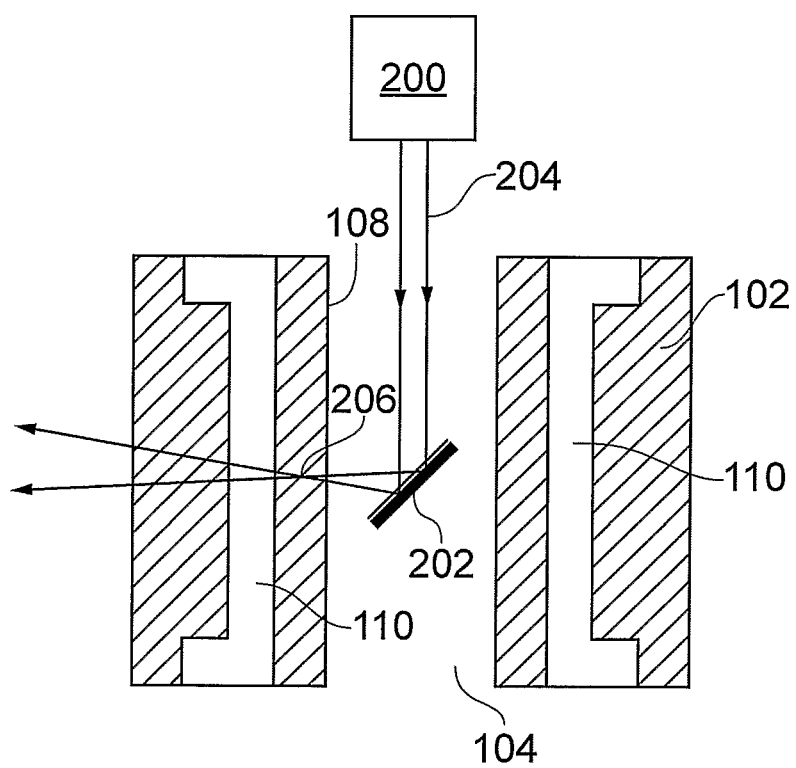
FIG. 7 is a schematic cross-section view illustrating a method of manufacturing a gas bearing according to an embodiment of the invention.

FIG. 7 shows a schematic view of apparatus for manufacturing a gas bearing having the laser drilled capillaries described above. This example is illustrated using the bearing housing 102 shown in FIG. 3 but may be applicable to other embodiments.

To form the radially extending capillaries, a high energy beam (e.g. laser beam) is generated in a beam generating apparatus 200 (e.g. Nd:YAG laser or the like). The output beam 204 from the apparatus 200 is directed e.g. using suitable optical devices into the shaft bore 104 where it is incident on the bearing surface 108. The beam may be pulsed in order to deliver enough energy to vaporise the material of the bearing housing 102 to form the capillary between the bearing surface 108 and the axially extending chamber 119 contained within the bearing housing 102.

In the embodiment shown in FIG. 7, the output beam 204 is directed into the shaft bore 104, e.g. along a direction substantially parallel to the axis of the bore. An optical device 202, e.g. a mirror or the like, is disposed in the shaft bore 104 to deflect the output beam 204 onto the bearing surface 108. For example, the optical device 202 may be arranged to deflect the output beam 204 so that it is incident on the bearing surface 108 in a direction substantially normal to that surface. In other embodiments, the output beam need not be deflected and may be incident at an angle on the bearing surface. For example, an angled beam may be directed towards the bearing surface from outside the bearing housing so that it slants across a diameter of the shaft bore.

To form the tapered gas-outlet to each capillary, the optical device 202 may be arranged to focus, i.e. narrow the output beam 204 to a focal point 206 located beyond the bearing surface 108 from the shaft bore 104. Both of the capillary and the tapering pocket may be formed when the optical device is in this configuration. Alternatively, the optical device may adopt a first configuration for forming the bore of the capillary that interconnects the bearing surface 108 with the axially extending chamber 110 and a second configuration for forming the pocket or opening.

A similar method may be used to form axially extending capillaries in an axially facing bearing surface. In such cases, the tapering gas-outlets to the capillaries may be formed by laser drilling an annular groove in the axially facing surface.

The invention claimed is:

1. A gas bearing comprising:
a one-piece bearing housing having a shaft bore defined by a radially inward facing bearing surface, and a plurality of capillaries formed as a result of laser-drilling through the bearing surface and extending radially into the bearing housing through the bearing surface to provide fluid communication between the bearing surface and a pressurisable space contained within and radially enclosed by the bearing housing,
wherein each laser-drilled capillary includes an gas-outlet at the bearing surface which narrows as it extends away from the bearing surface, and
wherein a pressurised gas supply is in fluid communication with the pressurisable space to provide a gas flow through the plurality of laser-drilled capillaries and out of their respective gas-outlets away from the bearing surface.

2. A gas bearing according to claim 1, wherein each gas-outlet includes an indented pocket formed in the bearing surface.

3. A gas bearing according to claim 2, wherein the indented pocket is a conical or spherical pocket formed in the bearing surface, wherein the capillary extends radially away from the base of the pocket.

4. A gas bearing according to claim 1, wherein the plurality of laser-drilled capillaries are located in two or more circumferential series of capillaries on the bearing surface.

5. A gas bearing according to claim 4, wherein each circumferential series comprises a predetermined number of capillaries formed at predetermined positions located at regular intervals around the circumference.

6. A gas bearing according to claim 1, wherein the pressurisable space comprises a plurality of chambers in fluid communication with each other along a common channel, wherein one or more of the chambers has an inlet conduit extending thereto from the outside of the bearing housing.

7. A gas bearing according to claim 6, wherein the inlet conduit exits the bearing housing at an axial end thereof.

8. A gas bearing according to claim 6, wherein the plurality of chambers comprises a plurality of separate axially extending bores arranged regularly on a ring around the shaft bore.

9. A gas bearing according to claim 1, wherein the one-piece bearing housing includes an axially facing bearing surface, and a plurality of laser-drilled capillaries extending axially into the bearing housing through the axially facing bearing surface to provide fluid communication between the axially facing bearing surface and the pressurisable space contained in the bearing housing, wherein each laser-drilled capillary includes a gas-outlet at the axially facing bearing surface which narrows as it extends away from the bearing surface.

10. A gas bearing according to claim 1, further comprising:
a gas feed passage formed in an axial end of the one-piece bearing housing to provide fluid communication between the pressurisable space and a gas supply,
wherein the one-piece bearing housing includes an unbroken circumferential layer located radially outwardly from the pressurisable space.

* * * * *